(12) United States Patent
Meijer et al.

(10) Patent No.: US 8,619,249 B2
(45) Date of Patent: Dec. 31, 2013

(54) LIGHT ANGLE SELECTING LIGHT DETECTOR DEVICE

(75) Inventors: Eduard Johannes Meijer, Eindhoven (NL); Peter Vergeer, Gouda (NL); Rifat Ata Mustafa Hikmet, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 555 days.

(21) Appl. No.: 12/738,672

(22) PCT Filed: Oct. 21, 2008

(86) PCT No.: PCT/IB2008/054333
§ 371 (c)(1),
(2), (4) Date: Apr. 19, 2010

(87) PCT Pub. No.: WO2009/053905
PCT Pub. Date: Apr. 30, 2009

(65) Prior Publication Data
US 2010/0238430 A1    Sep. 23, 2010

(30) Foreign Application Priority Data
Oct. 26, 2007 (EP) .................................. 07119349

(51) Int. Cl.
*G01B 11/26* (2006.01)
(52) U.S. Cl.
USPC ........... 356/138; 356/121; 356/450; 356/620; 250/505.1
(58) Field of Classification Search
USPC ............ 356/138, 139.02, 450, 121, 620, 222; 250/505.1
See application file for complete search history.

(56) References Cited

U.S. PATENT DOCUMENTS

| 3,435,246 | A | 3/1969 | Mildice |
| 4,052,616 | A | 10/1977 | Keller |
| 4,498,767 | A * | 2/1985 | McGovern et al. ........... 356/121 |
| 4,593,187 | A | 6/1986 | Grotts et al. |

(Continued)

FOREIGN PATENT DOCUMENTS

| DE | 3940146 A1 | 6/1991 |
| EP | 0321051 A2 | 6/1989 |
| FR | 2172828 A1 | 10/1973 |

(Continued)

OTHER PUBLICATIONS

Kishi et al: "5.1: Development of In-Plane EPD"; SID Digest 2000, pp. 24-27.

*Primary Examiner* — Sang Nguyen
*Assistant Examiner* — Isiaka Akanbi
(74) *Attorney, Agent, or Firm* — John F. Salazar; Mark L. Beloborodov

(57) ABSTRACT

This invention relates to a light angle selecting light detector device comprising a detector unit which is arranged to receive light selected by a selector unit. The device comprising at least one set of light passing areas. Each set of light passing areas consists of a first light passing area having a first size, which first light passing area is located on a first surface, and a second light passing area having a second size, which second light passing area is located on a second surface. The first light passing area and the second light passing area are arranged with a lateral displacement and form a light path from the first surface to the second surface for light having an incident angle between a maximum angle and a minimum angle.

13 Claims, 5 Drawing Sheets

(56) References Cited

U.S. PATENT DOCUMENTS

| | | | |
|---|---|---|---|
| 5,012,080 A * | 4/1991 | Griscom | 250/505.1 |
| 5,170,221 A * | 12/1992 | Matsui et al. | 356/121 |
| 5,517,017 A | 5/1996 | Yamada et al. | |
| 5,579,108 A * | 11/1996 | See | 356/450 |
| 5,757,478 A * | 5/1998 | Ma | 356/141.2 |
| 7,924,415 B2 * | 4/2011 | Leviton | 356/139.02 |
| 2004/0119908 A1 | 6/2004 | Sakai | |
| 2007/0034783 A1 | 2/2007 | Eliasson et al. | |

FOREIGN PATENT DOCUMENTS

| | | |
|---|---|---|
| JP | 55124007 A | 9/1980 |
| JP | 61142428 A | 6/1986 |
| JP | 8264826 A | 10/1996 |
| JP | 09208842 A | 10/1997 |
| JP | 9280842 A | 10/1997 |

* cited by examiner

LIGHT ANGLE SELECTING LIGHT DETECTOR DEVICE

FIELD OF THE INVENTION

The present invention relates to the field of light detectors, and more particularly to a light angle selecting light detector device comprising a selector unit and a detector unit, which detector unit is arranged to receive light selected by the selector unit.

BACKGROUND OF THE INVENTION

In research for improving ambient lighting systems and smart light management systems of today, there is an ambition to provide flexible user friendly solutions in which the user may determine the atmosphere created by a number of luminaries. In general, a room is illuminated with a multiple of distributed luminaries, and an intelligent light control system will be able to measure and control the lighting characteristics of each individual luminary. For this to be realized, two conditions should be met. One is the availability of light sources with tunable color and intensity. The maturing of LED technology has resulted in light sources that fulfill this demand. The other prerequisite is a control feedback system that measures the intensity and color of the individual luminaries simultaneously. In order to achieve this, optical sensors are required, for instance to measure the flux, the color point, the color rendering index, or even the full spectral distribution of the light illuminating a certain part of the room. In addition one would like to be able to measure what light source is illuminating which part of the room. When the fixture position of the light source is fixed and the light can be directed to different positions for instance with a beam steering technique, the source position of the light sources can be detected by measuring the angle under which the light beam hits the target position.

In addition optical sensors, which are coated with interference filters have an angular dependency in their spectral responsivity, which makes it difficult to make absolute wavelength measurements of light incident from many angles, i.e. diffuse light, with said optical sensors.

Patent application publication US 2004/0119908 A1 discloses a liquid crystal modulator device capable of accurate control of light from a light source. The device comprises R, G and B light emitting diodes, LEDs, a light guide plate for guiding and diffusing, i.e. mixing, light from the colored LEDs, and an optical sensor for each color of the light for measuring the mixed colored light in the light guide plate. To get an accurate light measurement of the mixed colored light in the light guide plate, direct light from the LEDs is blocked from reaching the individual optical sensor by providing the sensor with an incident light angle limiting device realized as a through hole in an absorbing piece of material. However, the solution is only applicable in a static environment where the color, position and light direction from each light source and the position, and orientation of the light sensors of such a system are fixed.

SUMMARY OF THE INVENTION

It is an object of the present invention to provide a light detector that alleviates the above-mentioned drawbacks of the prior art.

This object is achieved by a light angle selecting light detector device and a method for manufacturing a light angle selecting light detector device according embodiments of the present invention.

The invention is based on an insight that by selecting allowed incident angle of light from at least one light source to a light detector, accurate light measurements associated with light source position, light sensor element position and light incident angle are achieved.

Thus, in accordance with a first aspect of the present invention, there is provided a light angle selecting light detector device comprising a selector unit and a detector unit. The detector unit is arranged to receive light selected by the selector unit. Furthermore, the selector unit is arranged to have a first surface and a second surface. The first and second surfaces are arranged in parallel and above each other. Further, the surfaces are vertically separated by a distance. The device comprises at least one set of light passing areas. Each set of light passing areas consists of a first light passing area having a first size, which first light passing area is located on the first surface, and a second light passing area having a second size, which second light passing area is located on the second surface. The first light passing area and the second light passing area are arranged with a lateral displacement and form a light path from the first surface to the second surface for light having an incident angle between a maximum angle and a minimum angle.

Thus there is provided a light detector device comprising a selector unit and a light detector unit, in which before detecting the light a selection with respect to the incident angle of the light incident to the device is performed. The configuration of the selector unit results in that the device only allows light having an incident angle between a maximum angle and a minimum angle to enter the device and to be detected by the light detector unit. Because of the ability to select incident light of certain angles, the light detector device is advantageously applicable in combination with optical components or applications with light angular dependent responses. Some suitable areas for the device are for instance ambient intelligence applications and active single space control, such as control for lighting environments such as hotel lobbies, shop windows, office environments etc.

In accordance with an embodiment of the light detector device, the device comprises at least two sets of light passing areas, which have different lateral displacements. By having different lateral displacements for individual sets of light passing areas, a device is provided which has a spatial distribution of light paths with differentiating selection of angle ranges, i.e. depending on the location where incident light enters the selector unit, the maximum and minimum allowed angle of incident light passing that location, and thus the corresponding location on the detector unit, differs. This is advantageous for simultaneously detecting light from specific light sources or directions, while yet being able to separate the measurement data of each specific light source or direction.

In accordance with an embodiment of the light detector device, the lateral displacement for at least one set of light passing areas is controllable. Controllable lateral displacement allows for tunable selection of the range of incident angles for light that is allowed to enter the detector unit. For instance the selector unit may be set to sweep through a set of angle ranges and allow the detector unit to perform a series of light detector measurements corresponding to each set of angle ranges. Thus, even when the detector unit comprises a single sensor element, a series of measurements with different ranges of incident angles for the light is possible.

In accordance with an embodiment of the light detector device, the first and second sizes for at least one set of light passing areas are controllable, which offers an alternative way of providing tunable selection for the range of the incident angles for light that is allowed to enter the detector unit.

In accordance with an embodiment of the light detector device, the first and second sizes for at least one set of light passing areas are equal. This is advantageous, since having equally sized first and second light passing areas makes the manufacturing of the light paths in the selector device less complicated for some embodiments of the light detector device according to the present invention. E.g. when the light paths are manufactured by drilling or punching holes in a piece of material.

In accordance with an embodiment of the light detector device, the light detector unit comprises a light sensor array.

Thus, the detector unit is arranged having a plurality of light sensor elements disposed within the detector unit. The light sensor array may be designed as a row or a matrix of light detector sensor elements. Thus, the resulting measurements from the detector unit can cover simultaneous measurements for light entering the device in a plurality of positions on the device.

In accordance with an embodiment of the light detector device, the device further comprises at least one interference filter.

As the light angle selecting light detector device is provided with an optical filter, such as an interference filter, that has an angular dependent light response, the selection of the angle of the incident light and thus knowing the angle of the light entering the detector unit and the integrated interference filter in a certain position allows for accurate light measurements with an increased spectral resolution.

In accordance with an embodiment of the light detector device, the selector unit comprises a pixelated optical modulator comprising said first surface and the light detector unit comprises the second surface. The first and second light passing areas for the at least one sets of light passing areas are realized with a first and second set of pixels, each set of pixels comprising at least one pixel, located in the pixelated optical modulator and the light detector unit light sensor array, respectively. The optical modulator is capable of switching the pixels between a transparent state and a non-transparent state. Thus, there is provided a light detector device that when switching a pixel or a set of pixels on the optical modulator into a transparent state, while switching all remaining pixels of the optical modulator in a non-transparent state, and at the same time detecting light in a specific light sensor array element (or light sensor "pixel"), incident light of a specific range of light angles will be selected by that specific setup of first light passing area (the transparent pixel/set of pixels in the optical modulator) and the light sensor element. Furthermore, each specific light sensor array element available on the detector unit will in combination with the first light passing area on the optical modulator create a specific light path and thus select light of a specific range of light angles. Vice versa will be true for each individual light passing area that is switched into a transparent state on the optical modulator.

In accordance with an embodiment of the light detector device, the selector unit comprises a first pixelated optical modulator comprising the first surface, and a second pixelated optical modulator comprising the second surface. The first and second pixelated modulators are capable of switching between a transparent state and a non-transparent state. Furthermore, the first and second light passing areas for the at least one sets of light passing areas are realized with a first and second set of pixels, each set of pixels comprising at least one pixel, located in the first and the second modulators, respectively. Thus, an embodiment of the device according to the present invention is realized with two pixelated optical modulators. When having pixels in a pixel matrix that are switchable between a transparent and a non-transparent state, it is possible to address the pixel matrix and in an advantageous way control the disposing and size, e.g. the diameter, of current light passing areas. Furthermore, the light passing areas are then possible to close down by turning the pixels into a non-transparent state. The allowed incident light angles and specific positions of the detector unit to be illuminated are thus flexibly controllable by simply addressing the pixel matrices of the pixelated optical modulators.

In accordance with an embodiment of the light detector device, the optical modulators are selected from a group composed of liquid crystal modulators, electrophoretic modulators, and optical modulators based on electrowetting which is convenient. However, any optical modulator with pixels that are switchable between a transparent state and a non-transparent state is applicable for this embodiment of the light detection device according to the present invention.

In accordance with an embodiment of the light detector device, the selector unit and the detector unit are optically coupled. By optically coupling the detector unit and the selector unit, parallax problems arising from having an air gap between the detector unit and the selector unit are avoided. Typically, an embodiment in which the selector unit is realized with optical modulators has a glass substrate closest to the detector unit. Having an air gap between the glass and the detector unit causes parallel effects due to the transition of the light from the glass surface to the ambient air, which causes the light to refract away from the glass surface normal, and hence diverge in a wider light beam. By optically coupling the beam to the detector unit via a material with a high refractive index, the parallax problems are reduced. An alternative option is to allow the parallax problems, but to leave larger distances between the sensors in the detector unit, so as to prevent crosstalk.

In accordance with a second aspect of the present invention there is provided a method for manufacturing a light angle selecting light detector comprising the steps of:

providing a detector unit;

providing a selector unit comprising a first surface and a second surface in parallel, the first and second surfaces being placed a distance above each other;

arranging on the first and second surfaces at least one set of light passing areas, each set comprising a first light passing area on the first surface, and a second light passing area on the second surface. The first light passing area and the second light passing area are arranged with a lateral displacement and form a light path from the first surface to the second surface for light having an incident angle between a maximum angle and a minimum angle;

assembling the detector unit so as to receive light selected by the selector unit.

In accordance with an embodiment of the method, the first and second light passing areas are arranged to have a first and a second size, respectively.

In accordance with an embodiment of the method, the sets of light passing areas are arranged by providing holes in an absorbing piece of material.

In accordance with an embodiment of the method, the selector unit comprises a pixelated optical modulator, and the detector unit is pixelated and constitute a part of the selector unit such that the second surface is arranged on the pixelated detector unit. The first and second light passing areas for the at least one sets of light passing areas are realized with a first and second set of pixels, each set of pixels comprising at least one pixel, located in the pixelated optical modulator and the light detector unit, respectively. The optical modulator is capable of switching the pixels between a transparent state and a non-transparent state.

In accordance with an embodiment of the method, the selector unit comprises a first pixelated optical modulator comprising the first surface, and a second pixelated optical modulator comprising the second surface. The first and second pixelated modulators are capable of switching between a transparent state and a non-transparent state. The first and second light passing areas for the at least one sets of light passing areas are realized with a first and second set of pixels. Each set of pixels comprises at least one pixel and is located in the first and second modulators, respectively. These and other aspects, features, and advantages of the invention will be apparent from and elucidated with reference to the embodiments described hereinafter.

BRIEF DESCRIPTION OF THE DRAWINGS

The invention and its many advantages will be described in more detail below with reference to the accompanying schematic drawings, which for the purpose of illustration show some non-limiting embodiments and in which.

All the figures are highly schematic, not necessarily to scale, and they show only parts which are necessary in order to elucidate the invention, other parts being omitted or merely suggested.

DESCRIPTION OF PREFERRED EMBODIMENTS

The light angle selecting light detector device according to the present invention will now be described with reference to the enclosed drawings. In the following the light angle selecting light detector device for simplicity will be referred to as the light detector device.

Figure 1:
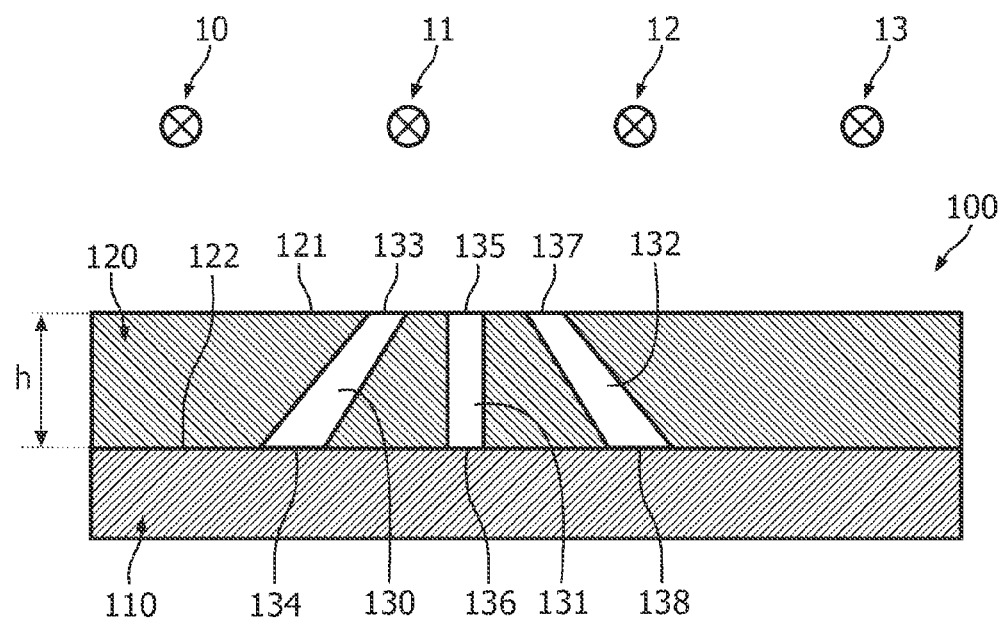
FIG. 1 illustrates a cross-sectional view of an embodiment of the light angle selecting light detector device according to the present invention.

Referring now to FIG. 1, the embodiment of the light detector device 100 according to the present invention comprises a selector unit 120 and a detector unit 110. The selector unit 120 is arranged to have a first surface 121 and a second surface 122, which is parallel to the first surface 121. The first and second surfaces, 121 and 122, are vertically separated by a distance h. The selector unit 120 is arranged with at least one light path, which allows for selected light to pass through the selector unit 120. In FIG. 1 three light paths 130, 131 and 132 are illustrated.

Each light path 130-132 is arranged to have a first light passing area 133, 135, 137 arranged in the first surface 121, and a second light passing area 134, 136, 138 arranged in the second surface 122. These first and second light passing areas form a set of two corresponding light passing areas, (133, 134), (135, 136) and (137, 138), that in turn each forms respective corresponding light path 130, 131, and 132. In practice this means that there is formed an entrance hole and an exit hole and a corresponding light path through the selector unit 120 for light incident to the selector unit 120, which light origins from at least one ambient light source, and in this example light sources 10-13.

According to an embodiment of the light detector device 100, the light paths 130-132 have been formed by drilling holes in different angles in a piece of black plastic. In yet another embodiment, the light paths have been formed by lasering holes in different angles in a light absorbing material such as black plastic. In an alternative embodiment the holes are formed by punching holes in a light absorbing material.

Incident ambient light, from the light sources 10-13, reaches the first surface of the selector unit 121. Due to the construction of the selector unit 120, light within a particular angle range passes through each light path 130-132, while other angle ranges are blocked by the selector unit 120. Further, the detector unit 110 is arranged to receive light that passes through the selector unit 120. In this exemplifying embodiment the detector unit is attached to the selector unit 120. However, in an alternative embodiment the selector unit 120 and the detector unit 110 are separated by a distance.

Figure 2:
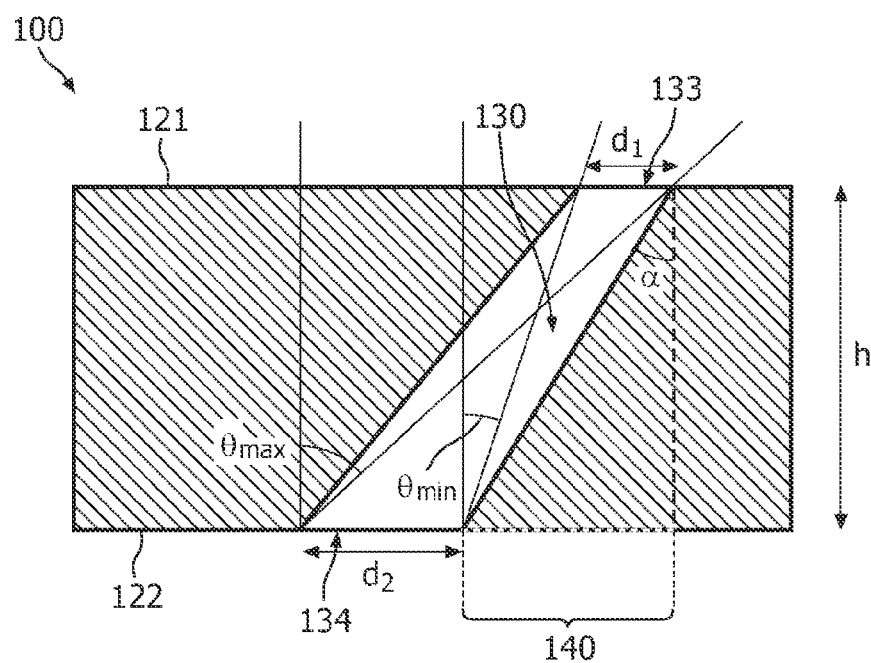
FIG. 2 illustrates a cross-sectional view of a selector unit in an embodiment of the device according to the present invention.

For the purpose of illustrating the principles of the light selector device 100 and the configuration of the light paths, one of the light paths 130 is illustrated in more detail in FIG. 2. The light passing areas are in this exemplifying example circle shaped. The first light passing area 133 has a first size determined by its diameter $d_1$. The second light passing area 134 has a second size determined by its diameter $d_2$. The first and second light passing areas, 133 and 134, are arranged having a lateral displacement 140 such that an angle denoted as $\alpha$ is formed with respect to the normal of the first and second surfaces 121, 122. Due to the arrangement of the light path 130 only light having an incident angle between a minimum angle $\theta_{min}$, and a maximum angle $\theta_{max}$ may pass the light path 130. This range of angles for light to pass through the two light passing areas 133 and 134 is determined by equation 1 and 2:

$$\theta_{min} = \arctan\left(\frac{h\tan\alpha - d_1}{h}\right) \qquad \text{Eq. 1}$$

$$\theta_{max} = \arctan\left(\frac{h\tan\alpha + d_2}{h}\right) \qquad \text{Eq. 2}$$

Figure 3:
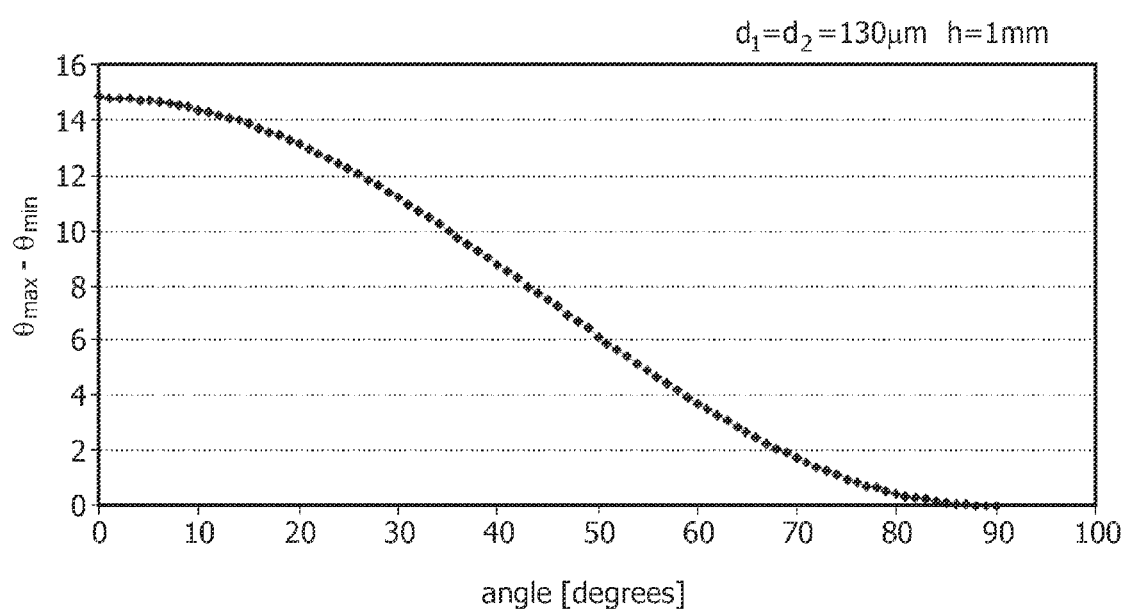
FIG. 3 is a plot illustrating the angle range for an embodiment of the device according to the present invention.

In an alternative embodiment the sizes, and hence the diameters, of the first and second light passing areas 133 and 134 are equal such that $d_1=d_2$. In a non-limiting example of the device 100 in this embodiment, the selector unit 120 is provided by lasered holes in a black absorbing plastic plate, i.e. the light paths are realized as holes ranging from the first surface 121 to the second surface 122 of the plastic plate, which holes are arranged with different angles $\alpha$. The plate thickness h is 1 mm and the first and second light passing areas are arranged having the same diameter of $d_1=d_2=130$ µm. The angle $\alpha$ of the individual holes is distributed from 0 degrees to 60 degrees in steps of 5 degrees. The resulting calculated allowed angle range for the selected light as a function of the angle $\alpha$ was calculated using equation 1 and 2 and is plotted in FIG. 3.

The second light passing areas 134-138 of the selector unit 120 are preferably positioned in a way that is convenient for the detector unit 110, and more particularly they are positioned to match a sensor comprised in the detector unit.

In an embodiment of the device, the second light passing areas are positioned close together, so as to keep the area of sensor 112 as small as possible.

Figure 4:
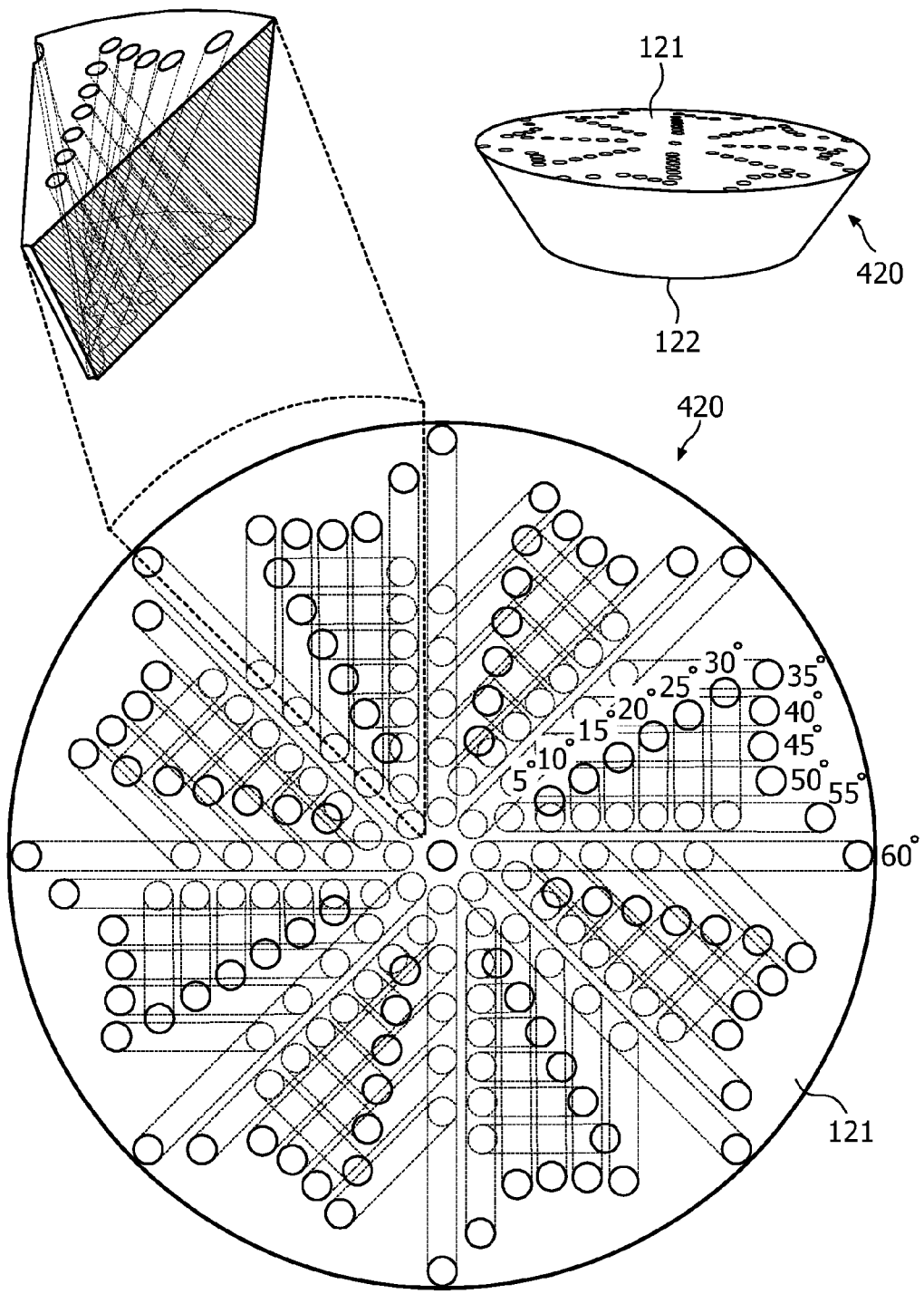
FIG. 4 is a schematic view from above of an embodiment of the device according to the present invention.

In another embodiment, as illustrated in a schematic view from above and perspective views of a selector unit 120 in FIG. 4, a plurality of closely packed light paths are arranged with a plurality of angles α in the selector unit 420. The light paths are arranged such that the detector unit 110 that receives light that has been selected by the selector unit 420 will receive incident light for a number of angle ranges, corresponding to the arranged light paths, on different positions of the detector unit 110. In this embodiment the sensor is preferably realized as a sensor matrix, such that each individual light path is detectable at a certain sensor element positioned on the sensor matrix. The selector unit 420 is provided with a total of 97 light paths, which light paths are realized as through holes arranged in a star pattern comprising a sub pattern of light paths symmetrically arranged in a radial pattern from the centre of the star, and which sub pattern is repeated a total of 8 times. Each light path in the sub pattern (denoted 5°, 10°, 15°, 20°, 25°, 30°, 35°, 40°, 45°, 50°, 55°, and 60° in FIG. 4), extends angularly radial and diametrically through the selector unit 420, i.e. from the first surface 121 of the selector unit 420 to the second surface 122 of the selector unit 420 inclining with each corresponding angle (5°, 10°, 15° . . . , 55°, 60°). The holes in the exemplifying non-limiting embodiment have a diameter of 130 μm and the angles of the holes ranges between 0 to 60 degrees with steps of 5 degrees (denoted in the figure).

Each white circle in the figure denotes a first light passing area on the first (top) surface 121 of the selector unit 120. Further, each dotted circle in the figure denotes a corresponding second light passing area on the second (bottom) surface 122 of the selector unit 120, wherein each set of first and second light passing areas forms a light path through the selector unit. The thickness of the selector unit is h=1 mm.

Figure 5A:
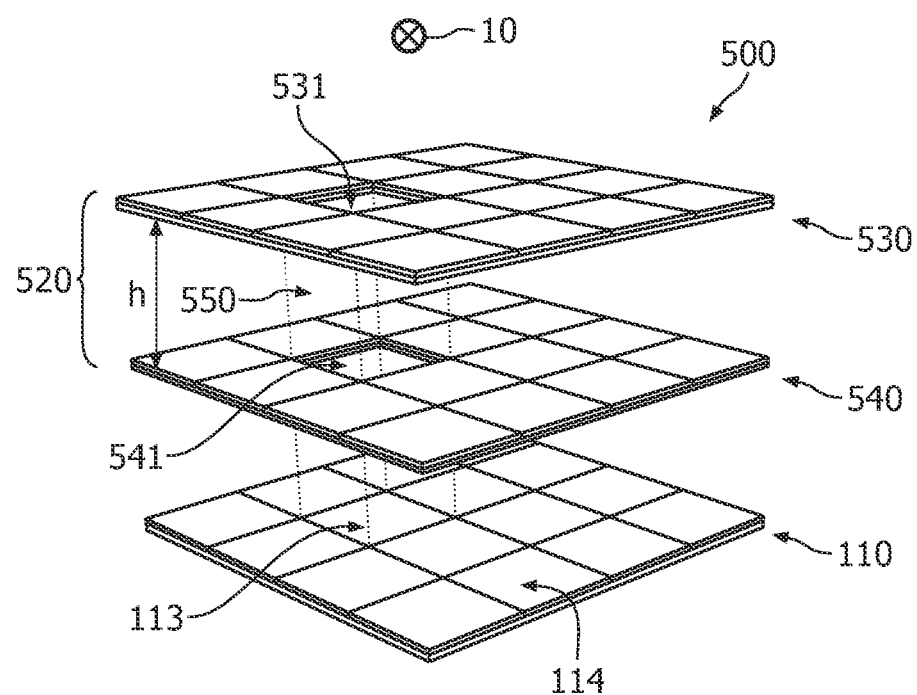
FIGS. 5 a) and b) are a schematic perspective view of an embodiment of the device according to the present invention.
Figure 5B:
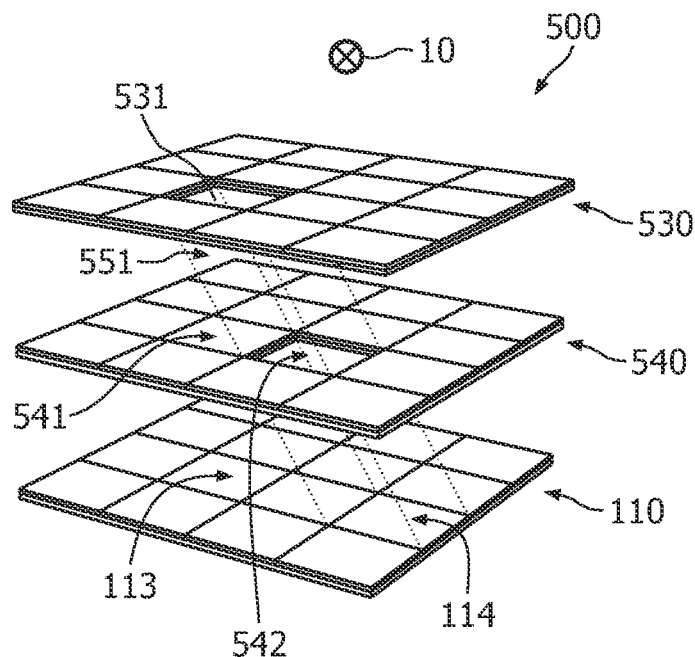

In another embodiment of the device 500 as illustrated in FIGS. 5 a) and b) the selector unit 520 is realized using two pixelated optical modulators, 530 and 540, which are parallel and distanced with a distance h. The term "pixelated" refers to having the anode and cathode patterned into pixel areas so as to provide the optical modulator with addressable pixels. (Each pixel will comprise an individual anode and cathode and the optical material, which may also include e.g. a filter or a polarizer, that is covered by that individual pixel area). Each pixel can be individually addressed and thus connected to voltage. This is well known to a person skilled in the art and will not be further described herein. In this exemplifying example, the optical modulators, 530 and 540, are each arranged to provide a patterned matrix of 4×4 pixels. The size and number of the pixels in each pixel matrix is optional and depends on the requirements of the current application. Each pixel is switchable between a transparent state and a non-transparent state. By transparent state is meant a state with at least some transmission of light, i.e. the light transmission does not have to be 100% but enough to differentiate from the non-transparent state in which substantially no transmission of light is present (e.g. due to absorption or reflection). The device 500 is further arranged to have a detector unit 110 comprising a sensor array in the form of a 4×4 matrix of light sensor elements. The sensors are realized with e.g. photo detectors. As the case with the pixels, the size of the sensors and number of sensors in the sensor matrix 110 is optional and depends on the requirements of the current application.

In the following the functionality of the selector device 520 is explained referring to FIG. 5 a) and further below to FIG. 5 b). Light from a light source 10 reaches the first optical modulator 530 in which all pixels are set in a non-transparent state except for one pixel 531, which is set in a transparent state. Thus, the transparent pixel 531 corresponds to a first light passing area. In the second optical modulator 540 all pixels are set in a non-transparent state except for pixel 541, which is set in a transparent state and further corresponds to a second light passing area. The first and the second light passing areas (corresponding to pixel 531 and pixel 541) forms a light path 550. Light of incident angles that are allowed passes through the selector unit 520 via the open light path 550, and reaches the sensor array of the detector unit 110 in a sensor element 113.

In FIG. 5 b) the previously transparent pixel 541 has been switched to a non-transparent state and another pixel 542 is switched to a transparent state. This results in an altered light path 551 for light to pass through the selector unit 520. The angle of the currently open light path is changed such that light of another incident angle range may pass the selector unit 520 and reach the detector unit 110. At the same time the position of the detector unit 110 that is reached by the light is altered to in this case the sensor pixel 114. Thus by activating different pixel combinations for the two optical modulators 530 and 540, the allowed range of angles of the light passing the selector unit 110 is altered, and different sensors in the detector unit 110 may be reached.

In an embodiment of the device comprising pixelated optical modulators, the pixel matrices are utilized not only to tune the angle α of the light paths by changing the position of the individual pixels, i.e. tuning the lateral displacement 140, of pixel pairs set to a transparent state, but in addition to change the size (and if desirable shape) of the light passing areas. In the previous example single pixels were arranged as a pixel pair (e.g. 531 and 542) to create a light path (551). Let us consider a case when the matrices of the optical modulators 530 and 540 are arranged to be 100×100. Then a combination of pixels may be set to be transparent and to form a first light emitting area on the first optical modulator 530 and correspondingly a combination of pixels on the second optical modulator 540 to form a second light emitting area. The pixels may be chosen to form, as an example, circle shaped light passing areas, which are controllable by switching appropriate pixels. Hence, tunable diameters (and hence size) of the light passing areas are obtainable.

In an embodiment of the device 520 comprising optical modulators, the optical modulators 530 and 540 are realized using liquid crystal (LC) cells. Liquid crystal cells are typically placed between crossed polarizers to be able to block light and thus be able to switch between a transparent and a non-transparent state. The transparent state then has a maximum transmission of 50% due to the absorption of light in the polarizers. Various LC configurations are applicable to the present invention, such as twisted nematic, hybridly aligned nematic, vertically aligned nematic, ferroelectric LC, etc.

In an alternative embodiment at least one optical modulator in the device comprises a pixelated electrophoretic modulator, where charged absorbing particles can be moved into the pixel area by means of an applied electric field. If the particles are in the pixel area the light is blocked, and if they are moved outside of the pixel area the light is transmitted through the pixel. This prior art technique is described in E. Kishi et al. "Development of In-Plane EPD" SID Digest 2000, pg 24-27, paper 5.1 and will not be further discussed here.

In an additional alternative embodiment electrowetting may be used to realize the pixelated optical modulator. The pixelated optical modulator comprises an absorbing liquid in combination with a transparent liquid (where one of the liquids is polar and the other liquid is apolar, which two liquids do not mix). By changing the electric field at the pixel surface the polar liquid can be pulled into the pixel and subsequently the apolar liquid is pushed out of the cell. This effect is called electrowetting. In short: the absorbing liquid can be moved in and out of the pixel again by applying a voltage across the cell resulting in the pixel switching between a transparent and a non-transparent state. See as a reference: Nature 425, 383-385 (25 Sep. 2003) "Video-speed electronic paper based on electrowetting" Robert A. Hayes, B. J. Feenstra.

In an alternative embodiment, the light detector device comprises additional compensation layers to achieve high contrast and compensation of light leakage at high incident angles of the incident light.

In an alternative embodiment wherein the selector unit is realized with optical modulators comprising liquid crystal modulators and the light passing areas are comprised of a set of pixels in the upper modulator 530 and a set of pixels in the lower modulator 540, these light passing areas are in combination switchable between a transparent and a non-transparent state. An example is the case when utilizing two stacked liquid crystal cells. As mentioned above liquid crystal cells are typically placed between crossed polarizers (a polarizer and an analyzer). The LC-cells are then in principle arranged such that in the transparent state linearly polarized light (due to the polarizer) is guided through the LC-cells and phase shifted 90 degrees. Hence the phase shifted light may exit the device via the analyzer. In the non-transparent state the LC-cell does not introduce this phase shift and the linearly polarized light entering via the polarizer is blocked by the analyzer. However, in this embodiment there is an option to have only two polarizers, one on top of the upper modulator 530 and one beneath the lower modulator 540, to switch between a transparent state and a non-transparent state for the two sets of pixels of the two combined modulators. In the transparent state, the two stacked liquid crystal cells then together introduce a 90 degree shift of the linearly polarized light, which enters the modulators 530, 540 via the polarizer of the upper modulator 530. Hence, the light may exit the selector unit 520 via the analyzer. The polarizer and analyzer are not depicted in the figures, but are well known to within the art.

Figure 7:
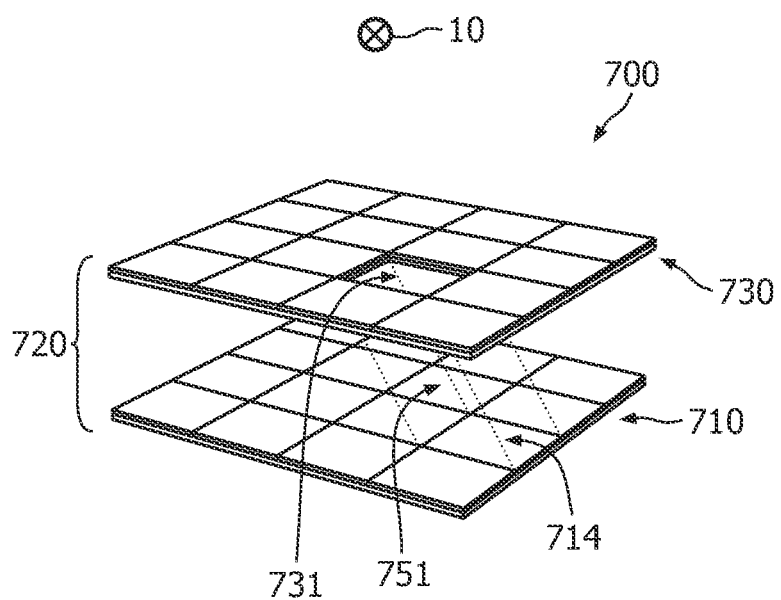
FIG. 7 is a schematic perspective view of an embodiment of the device according to the present invention.

According to an embodiment of the invention as illustrated in FIG. 7, the light angle selecting light detector 700 comprises a single pixelated optical modulator 730, which in this nonlimiting example is a pixelated liquid crystal cell between crossed polarizers. The principle of the light angle selecting selector unit 720 is here the same as for the embodiments as described above, with the difference that here the second surface 122 is arranged directly on the detector unit 710. Furthermore, the detector unit 710 comprises a light sensor array, i.e. is provided with addressable light sensor elements (or light element pixels).

When light from a light source 10 reaches the optical modulator 730 it can only pass through light passing areas that are switched into a transparent state. In FIG. 7 all pixels are set in a non-transparent state except for one pixel 731, which is set in a transparent state. Thus, the transparent pixel 731 corresponds to a first light passing area. Now consider light sensor element 714. The light sensor element 714 is activated and selects, i.e. acts as the second light passing area that together with the first light passing area forms a light path 751 from the pixelated optical modulator 730 to the pixelated detector unit 710 for light having an incident angle between a maximum angle and a minimum angle. Furthermore, the light sensor element 714 detects light that reaches the specific position of the light sensor element 714. Depending on what pixel or set of pixels of the pixelated optical modulator 730 that is switched to a transparent state, light of different light angle ranges reaches the light sensor element 714. As the detector unit 710 is arranged with a number of light sensor elements (4×4 in FIG. 7), for each light sensor element light of specific light angle ranges reaches the light sensor element depending on what pixel or set of pixels that is switched into a transparent state in the optical modulator 730.

Figure 6:
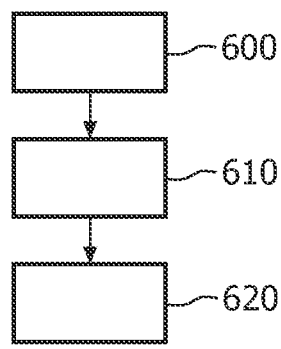
FIG. 6 is a flow chart illustrating an embodiment of the method according to the present invention.

A method of manufacturing a light angle selecting light detector according to the present invention comprises a number of steps, which are not obliged to be performed in a certain order. In the following the method will be described in a non-limiting example referring to FIG. 6. In step 600 a detector unit 110 is provided. As described above the detector unit 110 can be a single light sensor element or a matrix of light sensor elements. A selector unit 120 is provided in step 610. Different embodiments of the selector unit have been described above. For each of the embodiments the step of providing the selector unit 120 is directly depending on the specific embodiment. E.g. when providing the selector unit in a piece of material like absorbing plastic, the light paths of the selector unit are arranged by drilling or lasering holes with different angles (and optionally with a first and second size) in the material, while when realizing the selector unit with two sandwiched optical modulators, the light paths are realized by arranging the modulators with pixels that are switchable between a transparent and a non-transparent state. The functionality of the selector unit 120 when realized with two sandwiched optical modulators is described above. The optical modulators are e.g. liquid crystal modulators, electrophoretic modulators, or modulators that utilize electrowetting, which are well known in prior art, and the manufacturing and addressing of these are not further discussed here. The selector unit 120 and the detector unit 110 are then assembled in step 620, such that the detector unit 110 can receive light selected by the selector unit 120. Above, embodiments of the light angle selecting light detector device according to the present invention as defined in the appended claims have been described. These should be seen as merely non-limiting examples. As understood by a skilled person, many modifications and alternative embodiments are possible within the scope of the invention.

It is to be noted, that for the purposes of this application, and in particular with regard to the appended claims, the word "comprising" does not exclude other elements or steps, that the word "a" or "an", does not exclude a plurality, which per se will be apparent to a person skilled in the art.

The invention claimed is:
1. A light angle selecting light detector device comprising a selector unit and
a detector unit arranged to receive light selected by said selector unit, wherein said selector unit comprises
a non-transparent body having a first surface and a second surface,
said first and second surfaces being substantially parallel to each other and vertically separated by a distance,
said device comprising at least one light path defined by a cavity spanning from a first light passing area having a first size arranged at said first surface to a second light passing area with a second size arranged at said second surface and surrounded by said non-transparent body,
said first light passing area and said second light passing area being arranged with a lateral displacement,
wherein said light path allows light having an incident angle between a maximum angle and a minimum angle, determined by said first and second size, said lateral displacement, and said distance, pass through said selector unit.

2. A device according to claim 1, comprising at least two sets of light passing areas, which have different lateral displacements.

3. A device according to claim 1, wherein said lateral displacement for at least one set of light passing areas is variable.

4. A device according to claim 1, wherein said first and second sizes for at least one set of light passing areas are variable.

5. A device according to claim 1, wherein said first and second sizes for at least one set of light passing areas are equal.

6. A device according to claim 1, wherein said light detector unit comprises a light sensor array.

7. A device according to claim 1, further comprising at least one interference filter.

8. A device according to claim 6, wherein
said selector unit comprises a pixelated optical modulator comprising said first surface and
said light detector unit comprises said second surface,
wherein said first and second light passing areas are realized with a first and second set of pixels, located in said pixelated optical modulator and said light detector unit, respectively,
wherein said optical modulator is capable of switching the pixels between a transparent state and a non-transparent state, and
wherein said second set of pixels are addressable light sensor elements or light element pixels.

9. A device according to claim 8, wherein said optical modulators are selected from a group consisting of: liquid crystal modulators, electrophoretic modulators, and optical modulators based on electrowetting.

10. A device according to claim 8, wherein said selector unit and said detector unit are optically coupled.

11. A device according to claim 1, wherein
said selector unit comprises a first pixelated optical modulator comprising said first surface, and
a second pixelated optical modulator comprising said second surface,
wherein said first and second light passing areas for said at least one sets of light passing areas are realized with a first and second set of pixels, located in said first and said second modulators, respectively,
wherein said first and second pixelated modulators are capable of switching the pixels between a transparent state and a non-transparent state.

12. A method for manufacturing a light angle selecting light detector comprising the steps of:
providing a detector unit;
providing a selector unit in a non-transparent material, said selector unit having a first surface and a second surface arranged in parallel and having a distance between each other;
arranging in said selector unit at least one light path formed as a cavity spanning from a first light passing area having a first area size arranged at said first surface to a second light passing area with a second size arranged at said second surface, wherein said first light passing area and said second light passing area are arranged with a lateral displacement;
assembling said detector unit so as to receive light selected by said selector unit;
wherein said selector unit includes a pixelated optical modulator,
said detector unit is pixelated and constitute a part of said selector unit such that said second surface is arranged on said pixelated detector unit,
wherein said first and second light passing areas for said at least one sets of light passing areas are realized with a first and second set of pixels located in said pixelated optical modulator and said light detector unit, respectively,
wherein said optical modulator is capable of switching the pixels between a transparent state and a non-transparent state, and
wherein said first and second light passing areas are arranged to have a first and a second size, wherein said first size is different from said second size.

13. A method for manufacturing a light angle selecting light detector comprising the steps of:
providing a detector unit;
providing a selector unit in a non-transparent material, said selector unit having a first surface and a second surface arranged in parallel and having a distance between each other;
arranging in said selector unit at least one light path formed as a cavity spanning from a first light passing area having a first area size arranged at said first surface to a second light passing are with a second size arranged at said second surface,
wherein said first light passing area and said second light passing area are arranged with a lateral displacement;
assembling said detector unit so as to receive light selected by said selector unit;
wherein said selector unit includes a first pixelated optical modulator forming said first surface, and a second pixelated optical modulator forming said second surface,
wherein said first and second pixelated modulators are capable of switching between a transparent state and a non-transparent state,
wherein said first and second light passing areas for said at least one sets of light passing areas are realized with a first and second set of pixels, located in said first and second modulators, respectively.

* * * * *